US008342083B2

(12) United States Patent
Coopman

(10) Patent No.: US 8,342,083 B2

(45) Date of Patent: Jan. 1, 2013

(54) METHOD TO CONTROL OPERATION AND SAFETY OF A HYDRAULIC PRESS

(75) Inventor: Jose Andre Cornelius Coopman, Ypres (BE)

(73) Assignee: Robosoft, Naamloze Vennootschap, Ypres (BE)

( * ) Notice: Subject to any disclaimer, the term of this patent is extended or adjusted under 35 U.S.C. 154(b) by 416 days.

(21) Appl. No.: 12/654,022

(22) Filed: Dec. 8, 2009

(65) Prior Publication Data

US 2010/0139506 A1 Jun. 10, 2010

(30) Foreign Application Priority Data

Dec. 9, 2008 (BE) .................................. 2008/0661

(51) Int. Cl.

*B30B 15/26* (2006.01)

*B30B 15/16* (2006.01)

*G06F 19/00* (2011.01)

(52) U.S. Cl. ............................ 100/35; 100/43; 700/206

(58) Field of Classification Search .................... 100/35, 100/46, 48, 50, 341, 347, 43; 72/17.2, 20.1, 72/21.1, 21.5; 700/206

See application file for complete search history.

(56) References Cited

U.S. PATENT DOCUMENTS

| | | | | |
|---|---|---|---|---|
| 4,148,203 | A | 4/1979 | Farazandeh et al. | |
| 4,366,689 | A * | 1/1983 | Yajima | 72/10.9 |
| 4,430,879 | A | 2/1984 | Rolland | |
| 4,510,570 | A * | 4/1985 | Yonekura | 700/206 |
| 4,524,582 | A | 6/1985 | Lucas et al. | |
| 4,797,831 | A * | 1/1989 | Dressing et al. | 700/165 |
| 4,819,467 | A * | 4/1989 | Graf et al. | 72/20.1 |

FOREIGN PATENT DOCUMENTS

| | | |
|---|---|---|
| EP | 0 508 753 | 10/1992 |
| GB | 2186394 | 8/1987 |
| JP | 58-110200 | 6/1983 |
| JP | 10-193199 | 7/1998 |
| JP | 2001-198623 | 7/2001 |

* cited by examiner

*Primary Examiner* — Jimmy T Nguyen

(74) *Attorney, Agent, or Firm* — Dowell & Dowell, P.C.

(57) ABSTRACT

Method for a safety and testing control for a press, including a hydraulic system with at least one hydraulic cylinder, operated by means of a hydraulic valve controlled by a programmable processing unit where a number of electrical signal inputs and outputs are provided and into which a software program is loaded, where a position sensor is provided that indicates the position of the hydraulic cylinder and where the software application works solely on the basis of an internal timer and the aforementioned position sensor can control the motion of the press as well as a hydraulic press working according to this method and using the software and carrier.

11 Claims, 3 Drawing Sheets

METHOD TO CONTROL OPERATION AND SAFETY OF A HYDRAULIC PRESS

BACKGROUND OF THE INVENTION

1. Field of the Invention

This invention concerns a method to control operation and safety of a hydraulic press.

More specifically, the invention is intended for operating a press equipped with a hydraulic system by means of a software application provided for that purpose that is loaded into the memory of a programmable processing unit.

In this instance, the word 'press' should be interpreted in the general sense. Bending-off presses, punch presses, folding benches and suchlike are therefore covered by the general term 'press' used here.

2. Description of Related Art

Hydraulic presses operated by CNC machines, PLCs and other programmable processing units provided with the necessary software already exist.

Such presses generally include at least one hydraulic cylinder operated by means of a hydraulic valve.

In the existing systems, the software uses transducers and/or feedback signals on the hydraulic valve to operate the press.

A disadvantage of this, naturally, is that it requires the necessary hardware.

Such existing presses generally also show the disadvantage of carrying out a safety check only before or after an operation, not during the operation itself.

Another disadvantage of such known presses is that it is possible to circumvent certain safety provisions by for instance bridging contacts or suppressing the feedback signals.

An additional disadvantage is that a part can be installed during repair or maintenance of the press that is not fully compliant or functions poorly without this being detected by the CNC or other programmable processing unit.

The objective of the present invention is to offer a solution to at least one of the aforementioned and other disadvantages.

BRIEF SUMMARY OF THE INVENTION

The invention therefore concerns a method to control operation and safety of a press including a hydraulic system with at least one hydraulic cylinder operated by means of a hydraulic valve, where operation takes place with the intervention of a programmable processing unit equipped with a number of electrical signal inputs and outputs and into which a software programme is loaded whereby:

at least one incremental position sensor is provided that indicates the position of the hydraulic cylinder and whereby the result of this measurement is automatically transferred to the programmable processing unit and where this position sensor is independent of any transducers or feedback signals on the hydraulic valve and the aforementioned software application works solely on the basis of the programmable processing unit's internal clock or timer and, on the basis of the value from the aforementioned incremental position sensor, can at least:

determine the operating speed of the press;

control the motion pattern of the press in accordance with pre-programmed profiles;

calculate the hydraulic pressure in the system;

evaluate the status of the hydraulic system before, during and after the press has executed an operation;

detect the status, correct functioning and closed position of the hydraulic valve or valves;

detect any leaks that might occur in various places in the hydraulic system;

test and control the press' lag length and time.

One advantage is that there is no need for transducers and/or feedback signals on the hydraulic valve to operate the press. As a result less hardware is required.

Another advantage is that the safety check of the press is carried out not only before and after a machine operation but also during machine operation itself, thus providing a higher safety level.

An additional advantage is that if a part is installed during repair or maintenance of the press that is not fully compliant or functions poorly, this can be detected by the software.

A further advantage is that any motion pattern determined by position, distance, speed and pressure can be pre-programmed and realised within the operational limits of the press.

The invention seeks protection for a software application that can be used to control operation and safety of a hydraulic press in accordance with the described method.

To that end, the invention also incorporates a software application that includes instructions for a safety and testing control for a press, which press includes a hydraulic system with at least one hydraulic cylinder operated by means of a hydraulic valve, whereby the software application, when loaded into a programmable processing unit equipped with a number of electrical signal inputs and outputs, is characterised in that:

the software application automatically reads and processes the position of at least one incremental position sensor, which gives the status of the hydraulic cylinder, preferably independently of any transducers or feedback signals on the hydraulic valve;

the software application works solely on the basis of the pre-programmable processing unit's internal clock or timer and the value of the aforementioned incremental transducer and has at least the functionality defined above in the description of the method as the minimum requirements for the application software.

The invention also seeks protection for a carrier of such a software application and for a programmable processing unit into which such a software application is loaded.

The invention therefore also concerns a product of a software application including a medium that can be read by a programmable processing unit and on which information signals are registered that are representative of a software application with at least the functionality defined above in the description of the method as the minimum characteristics for the software application.

The invention also aims for a programmable processing unit where a software application with at least the functionality defined above in the description of the method as the minimum requirements for the application software is loaded into a memory of this programmable processing unit or is automatically loaded into a memory of this programmable processing unit on start-up.

BRIEF DESCRIPTION OF THE DRAWINGS

To better demonstrate the characteristics of the invention a preferential model of an operation and safety control for a hydraulic press is described below as an example, without any limiting character, in accordance with the invention, referring to the enclosed drawings, in which.

DETAILED DESCRIPTION OF THE INVENTION

Figure 1:
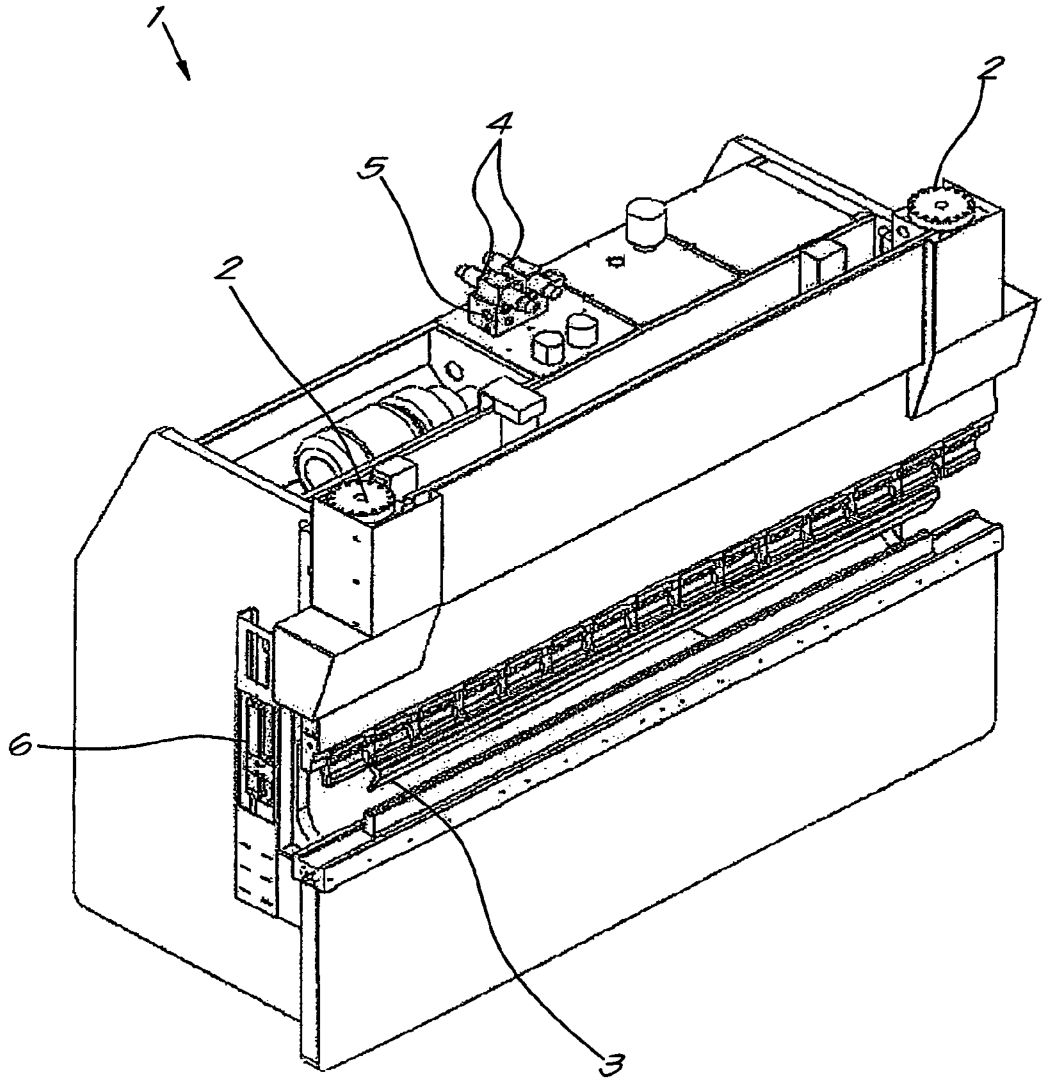
FIG. 1 gives a diagrammatic representation in perspective of a hydraulic press with an operation and safety control, in accordance with the invention.

FIG. 1 gives a diagrammatic representation of a bending-off press 1 as an application example of a hydraulic press 1 with an operation and safety control according to the invention.

The press 1 is equipped with two hydraulic cylinders 2, which drive an up and down motion of the ram 3.

In this example, a hydraulic valve 4 is fitted for each hydraulic cylinder 2. In a preferential model these hydraulic valves 4 have no transducers or feedback signals. In this example, the hydraulic valves 4 are housed in a hydraulic monoblock 5, together with other components of the hydraulic system.

Devices 6 are fitted close to each hydraulic cylinder 2, which determine the position of the cylinder concerned. In this example, these devices 6 are incremental position sensors.

In this text, the term 'incremental position sensor' refers to a sensor that can measure the relative movement of two parts in relation to one another at a certain resolution. This measurement can be based on various physical principles so that the input, for example, can be either an optical, electromagnetic or mechanical signal. The output consists of an electrical signal from which the relative position can be deduced, possibly with knowledge of a certain reference position.

Figure 2:
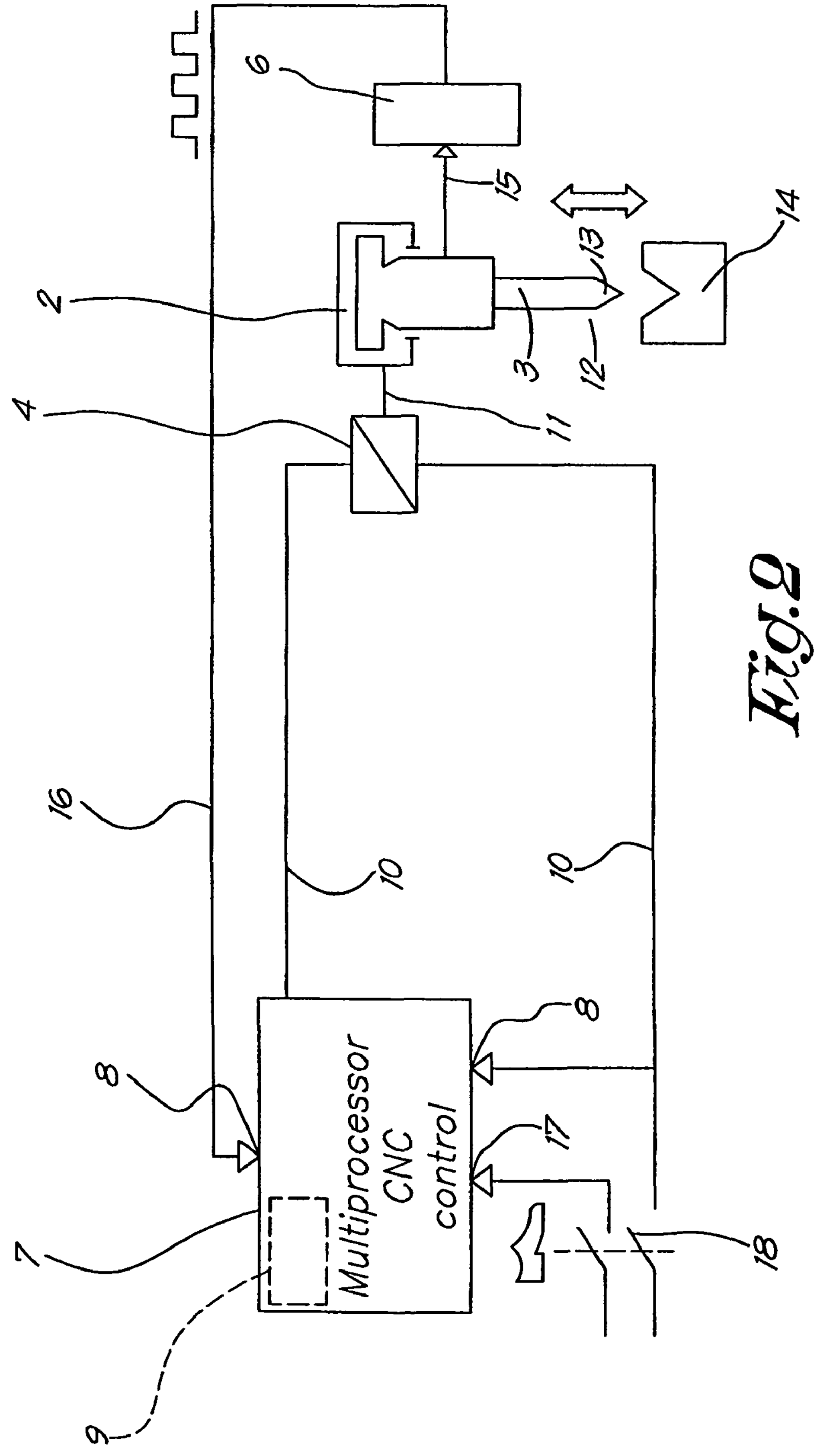
FIG. 2 gives a diagrammatic representation of the major components of a press control according to with FIG. 1.

FIG. 2 gives a diagrammatic representation of the major components and the connections between them.

In this example, the programmable processing unit 7 is a multiprocessor CNC system 7, equipped with a number of electrical signal inputs and outputs 8.

This CNC system 7 is also equipped with a memory into which the software application 9 can be loaded.

The electrical drive of each hydraulic valve 4 is connected to the CNC system 7 by an electrical circuit 10.

The hydraulic valve 4 is connected to the associated hydraulic cylinder 2 by a hydraulic hose 11.

The ram 3 is attached to the piston of the hydraulic cylinder 2 and will therefore follow its motion.

The free end 12 of the ram 3 is fitted with a mould part 13 that cooperates with a corresponding mould part 14 on the stationary part of the press 1.

The connection 15 between the incremental position sensor 6, which shows the position of the relevant hydraulic cylinder 2, can, as mentioned, take various physical forms.

The output of the incremental position sensor 6 is fed back via the connection 16 to the electrical signal inputs 8 of the CNC system 7.

The CNC system 7 is also equipped with a number of extra electrical signal inputs and outputs 17. In the press 1 in FIG. 2, for example, a foot pedal 18 is connected to one of these extra electrical signal inputs and outputs 17.

The functioning of an operation and safety control for a hydraulic press 1 is extremely simple and as follows.

After starting up and initialising the CNC system 7, the software application 9 will first conduct a self test.

This could, for example, include testing the electrical signal inputs and outputs 8, 17 and an initial test of the hydraulic components 2, 4, 5.

When a multi-processor system is used, the synchronisation between the various processes and processors can be tested.

If the self test does not proceed as it should or as soon as a certain status is not present, this is detected immediately.

If the error can be corrected, the CNC system 7 will immediately and automatically take corrective measures through the intervention of the software application 9.

If this is not the case, or when safety might be endangered in some way, then the CNC system 7 will be able to interrupt the machine operation and put the hydraulic system 2, 4, 5 into a safe condition, also via the software application 9. An error message is hereby generated by the CNC system 7.

The same principle of error detection, error correction or transition to safety mode will always remain active and will also be followed when a problem arises during an operation.

When the press 1 starts an operation, it is possible to first test whether the press 1 is in a correct initial configuration before starting up the actual operation.

The application software 9 operates the hydraulic valves 4 by means of the digital and analogue electrical signal outputs 8 of the CNC system 7.

This may change the position of the hydraulic cylinders 2. The incremental position sensor 6 will register this change and transmit it to the CNC system 7.

Based on timers or a clock, the results of the incremental position sensor 6 and a number of system constants, the software application 9 can calculate various status variables such as movement, speed, acceleration and pressure.

Any oscillations can also be analysed, as they can be an indication of possible problems.

Based on the measurements and the phase of the programmed processing, the control knows where the cylinders 2 are and where they should be.

If the motion progresses as it should, if necessary the digital and analogue electrical signal outputs 8 of the CNC system 7 are adjusted to control the further progress of the processing.

Any problems are dealt with as described above.

Figure 3:
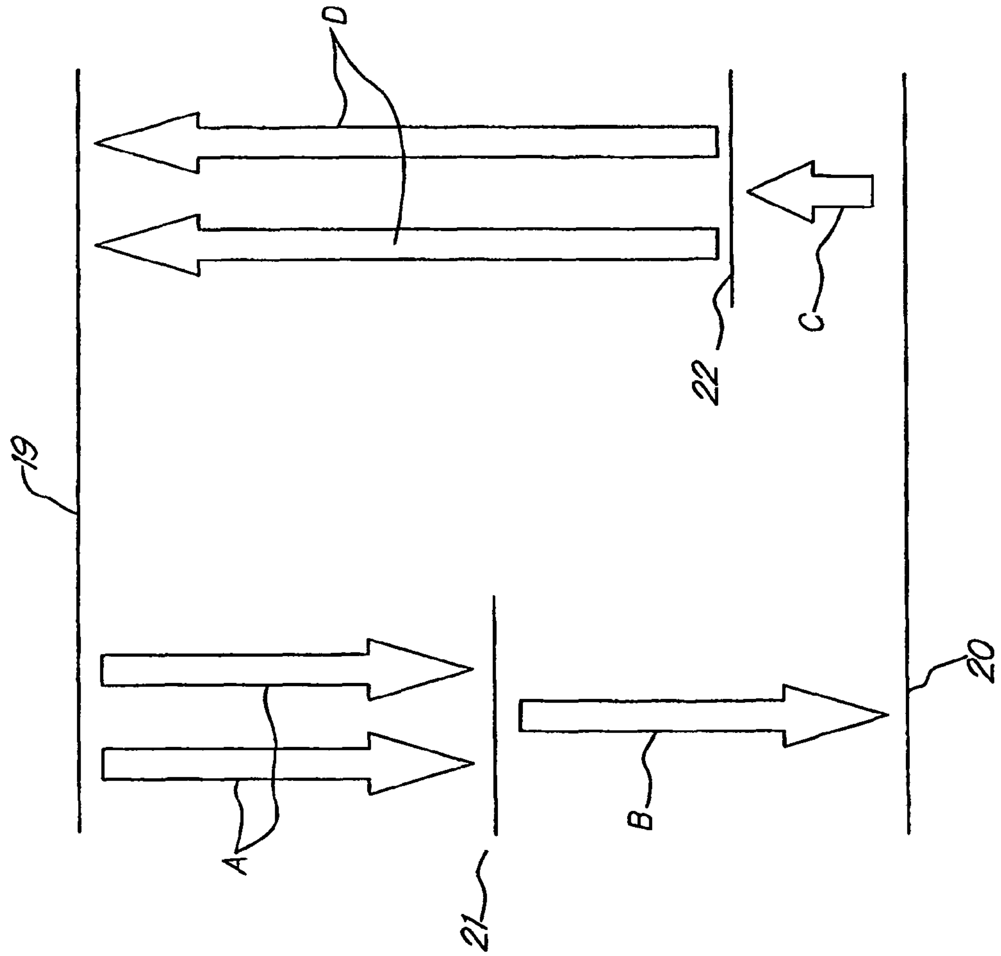
FIG. 3 gives a diagrammatic representation of the steps of an operation by the press in FIG. 1.

FIG. 3 gives a diagrammatic representation of various steps that are carried out during a folding cycle of the bending-off press 1 described as an example.

During the processing, the hydraulic cylinder 2 will move between an uppermost dead point 19 and a lowermost dead point 20. At these points, the speed of the piston of the hydraulic cylinder 2 is nil.

In a first phase, the ram 3 will descend with a fall velocity represented by arrows A until a transition point is reached. During this phase, the press 1 should exert negligible or no forces on the workpiece.

In a second phase, the ram 3 will descend further from this transition point 21 until the lowermost dead point 20 is reached.

In this phase, the workpiece is folded between the mould part 13 attached to the free end 12 of the ram 3 and a corresponding mould part 14 on the stationary part of the press 1. As a great force is required in this phase, this happens at a lower speed, represented by arrow B.

In a third phase, the ram 3 returns to its starting position at the uppermost dead point 19. The first part of this motion progresses slowly until an intermediary decompression point 22, as represented by arrow C. From the decompression point 22 the ram 3 will ascend at a higher speed, represented by arrows D. The ram 3 is brought to a halt at the uppermost dead point 19.

In an operation and safety control for a hydraulic press 1 the software application 9 should preferably be constructed in such a way that the press 1 is protected against unauthorised system adjustments.

The invention also concerns a press 1, equipped with an operation and safety control, which press 1 includes a hydraulic system 2, 4, 5 with at least one hydraulic cylinder 2 and one programmable processing unit 7, whereby the hydraulic cylinder 2 is operated by means of a hydraulic valve 4 and whereby the programmable processing unit 7 is equipped with a number of electrical signal inputs and outputs 8 and, with the intervention of the software application 9 provided for that purpose, which is loaded into a memory of this programmable processing unit 7, operates and tests the functioning of the press 1, characterised in that:

- devices 6 are fitted that determine the position of the hydraulic cylinder 2 whereby the result of this measurement is automatically transmitted to the programmable processing unit 7 and whereby these devices 6 are independent of any transducers or feedback signals on the hydraulic valve 4 and
- solely on the basis of the programmable processing unit's 7 internal clock or timer and the result of determining the position of the hydraulic cylinder 2, the aforementioned software application 9 has at least the functionality defined as the minimum characteristics for the application software 9 in the description of the method above.

An operation and safetycontrol for a hydraulic press 1 in accordance with the invention can exhibit various other characteristics. The list below is by no means exhaustive, but gives a number of examples.

- The press 1 described is only an example. A hydraulic press 1 with an operation and safetycontrol in accordance with the invention can be of another type, with a different number of hydraulic cylinders 2, intended for carrying out other processing cycles and so forth.
- The aforementioned programmable processing unit 7 need not necessarily be a standard CNC system 7. A PLC, a standard computer equipped with a number of electrical signal inputs and outputs 8 or suchlike could also be used, for example.
- The programmable processing unit 7 could be a unit with one or more processors, possibly communicating and working with each other. The software application could be constructed in such a way that parallel processing may be implemented.
- The programmable processing unit 7 could be equipped with or capable of being equipped with a number of extra digital and/or analogue inputs and outputs 17 for any peripheral functions. The software application 9 could possibly execute the operation and testing of this peripheral equipment 18. In this way, it is possible to make the programmable processing unit 7 and the software application 9 suitable for use with all light curtains and/or screens.
- The programmable processing unit 7 and the software application 9 could possibly operate several hydraulic aggregates 1, 5 simultaneously. That operation can be either synchronous or asynchronous.
- In addition to or as a replacement of the pressure calculation, one or more pressure measurements can be provided for. By automatically transmitting the result of this measurement or measurements to the programmable processing unit 7 by means of one or more electrical signal inputs 8, 17, the software application 9 can read and process the result.

The method described above can be applied and implemented unaltered in a software application 9 independent of the hydraulic pressure in the system and using a wide variety of hydraulic components 2, 4, 5.

It goes without saying that not only do the above and other characteristics apply to the programmable processing unit 7 and the application software 9, but these characteristics can also be provided for in a method for an operation and safety control for a hydraulic press 1.

The present invention is in no way limited to the model described as an example and represented in the figures; an operation and safety control for a hydraulic press according to with the invention can be realised in all kinds of shapes and sizes without exceeding the scope of the invention.

The invention claimed is:

1. Method for an operation and safety control for a press (1), including a hydraulic system with at least one hydraulic cylinder (2), operated by means of a hydraulic valve (4) controlled by the intervention of a programmable processing unit (7) whereby a number of electrical signal inputs and outputs (8) are provided and into which a software application (9) is loaded, the method comprising:

at least one incremental position sensor (6) is fitted to determine a position of the hydraulic cylinder (2) whereby a result of the determination of the position of the hydraulic cylinder is automatically transmitted to the programmable processing unit (7) and whereby the position sensor (6) is independent of any transducers or feedback signals on the hydraulic valve (4) and on the basis of the programmable processing unit's (7) internal clock or timer and the result of the aforementioned incremental position sensor (6), the aforementioned software application (9) can:

determine an operating speed of the press (1);

control a motion pattern of the press (1) in accordance with pre-programmed profiles;

calculate a hydraulic pressure in the hydraulic system;

evaluate a status of the hydraulic system before, during and after the press (1) executes an operation;

detect a status, correct functioning and closed position of the hydraulic valve or valves (4);

detect possible leaks that might occur in various places in the hydraulic system; and test and control lag length and time of the press (1).

2. Method according to claim 1, wherein the programmable processing unit (7), provided with the aforementioned software application (9) immediately and automatically takes corrective measures on failure of the hydraulic system or, if this is not possible, puts the hydraulic system into a safe condition.

3. Method according to claim 1 wherein in addition to or as a replacement of the pressure calculation at least one additional pressure measurement is provided whereby the result of that measurement is automatically transmitted to the programmable processing unit (7) by means of one or more electrical signal inputs (8).

4. Method according to claim 1 wherein the hydraulic valve or valves (4) are not fitted with transducers or feedback signals.

5. Method according to claim 1 wherein the aforementioned programmable processing unit (7) is constructed as a standard CNC system.

6. Method according to claim 1 wherein the aforementioned programmable processing unit (7) is constructed as a unit with several processors.

7. Method according to claim 1 wherein the programmable processing unit (7), equipped with the aforementioned software application (9), can control several hydraulic aggregates (1, 5) either synchronically or asynchronically.

8. Method according to claim 1 wherein the programmable processing unit (7), equipped with the aforementioned software application (9), can control additional inputs and outputs (17) for any peripheral functions (18).

9. Method according to claim 8, wherein the programmable processing unit (7), equipped with the aforementioned software application (9), can be used with all light curtains and/or screens.

10. Method according to claim 1 wherein the programmable processing unit (7), equipped with the aforementioned software application (9), offers protection against unauthorized system adjustments.

11. Method according to claim 1 wherein the method is independent from the pressure force and can be applied unaltered with several hydraulic components (2, 4, 5) for the hydraulic system.

* * * * *